(12) United States Patent
Tong et al.

(10) Patent No.: US 11,757,538 B2
(45) Date of Patent: Sep. 12, 2023

(54) METHOD, DEVICE AND SYSTEM FOR UNDERWATER ACOUSTIC COMMUNICATION

(71) Applicant: Xiamen University, Xiamen (CN)

(72) Inventors: Feng Tong, Xiamen (CN); Siyuan Zheng, Xiamen (CN); Bin Li, Xiamen (CN); Xiuling Cao, Xiamen (CN)

(73) Assignee: Xiamen University, Xiamen (CN)

( * ) Notice: Subject to any disclaimer, the term of this patent is extended or adjusted under 35 U.S.C. 154(b) by 464 days.

(21) Appl. No.: 16/803,747

(22) Filed: Feb. 27, 2020

(65) Prior Publication Data

US 2020/0280374 A1 Sep. 3, 2020

(30) Foreign Application Priority Data

Feb. 28, 2019 (CN) .......................... 201910151457.5

(51) Int. Cl.
*H04B 13/02* (2006.01)
*H04B 11/00* (2006.01)
*B63G 8/00* (2006.01)

(52) U.S. Cl.
CPC ............. *H04B 11/00* (2013.01); *B63G 8/001* (2013.01); *H04B 13/02* (2013.01); *B63G 2008/004* (2013.01)

(58) Field of Classification Search
CPC ........ H04B 11/00; H04B 13/02; B63G 8/001; B63G 2008/004
See application file for complete search history.

(56) References Cited

U.S. PATENT DOCUMENTS 6,272,072 B1 * 8/2001 Wulich ................. G01S 3/8022
367/118

FOREIGN PATENT DOCUMENTS

CN 108737303 A * 11/2018 ............. H04B 13/02

* cited by examiner

*Primary Examiner* — Isam A Alsomiri
*Assistant Examiner* — Abdallah Abulaban
(74) *Attorney, Agent, or Firm* — CALFEE HALTER & GRISWORLD LLP

(57) ABSTRACT

A method for underwater acoustic communication includes steps of S1: capturing a synchronization signal using a cross-correlation operation; S2: performing time forward shifting and reversing processing and time backward shifting and reversing processing, respectively, on the synchronization signal to obtain a forward shifted time reversal coefficient and a backward shifted time reversal coefficient; S3: performing a convolution operation of the forward shifted time reversal coefficient and the backward shifted time reversal coefficient, respectively, with a subsequently captured information sequence to obtain a forward shifted time reversal output and a backward shifted time reversal output; S4: processing the forward shifted time reversal output and the backward shifted time reversal output, respectively, with a forward shift equalizer and a backward shift equalizer to obtain two sets of equalizer outputs; and S5: selecting one of the two sets of equalizer outputs with a smaller error for data decoding to obtain a desired signal.

7 Claims, 7 Drawing Sheets

METHOD, DEVICE AND SYSTEM FOR UNDERWATER ACOUSTIC COMMUNICATION

RELATED APPLICATIONS

This application claims priority to Chinese Patent Application No. 2019101514575, filed on Feb. 28, 2019, the entire contents of which are incorporated herein by reference.

TECHNICAL FIELD

The present application relates to the field of underwater acoustic communication, and in particular, to a method, device, and system for underwater acoustic communication.

BACKGROUND

With the increasing demand for marine information acquisition and transmission in areas such as marine exploration, resource development, environmental monitoring, and national defense security, underwater robots that can replace humans for various underwater tasks, also known as unmanned remotely controlled vehicles (AUVs), have become essential marine high-tech equipment. In recent years, micro-AUVs have become research hotspots of marine research institutions and companies in various countries due to their outstanding advantages such as a small size, a low cost, convenient deployment and recycling, and easy formation and networking.

For communication means indispensable for the realization of AUV telemetry and remote control, the use of cabled communication will bring problems such as inconvenient cable transmission and reception, and easy winding. Underwater acoustic communication provides a convenient underwater cableless communication approach and is therefore widely used in various underwater robots. Considering the strong multipath and poor stability of underwater acoustic channels, especially the Doppler caused by movement in AUV operations, the design of high-performance system for underwater acoustic communications is confronted with great difficulties. In order to suppress the influence of Doppler in Non-Patent Document 1, a method of first performing Doppler estimation and then suppressing by resampling is generally adopted.

However, compared with mobile platforms such as dedicated underwater robots and manned submersibles, various types of micro-underwater unmanned submersibles are small in size and limited in energy, while algorithms for traditional underwater acoustic communication to suppress Doppler, such as Doppler estimation and resampling compensation, require higher computational complexity, entailing an underwater acoustic communicator with higher computational power, power consumption requirements, and corresponding costs. Therefore, the low-complexity, low-cost underwater acoustic communicator suitable for micro AUVs is still a technical embarrassment.

The passive time reversal technique uses a received probe signal to obtain channel multipath information, and constructs a preprocessor to focus the multipath of the received signal, thereby suppressing multipath and improving processing gain. It is a research hotspot in the field of underwater acoustic communication.

At present, in most cases passive time reversal processing is combined with a postponed channel equalizer. By using post-processing to suppress the residual multipath after time reversal, the communication performance can be further improved, and the computational complexity of the post-channel equalizer is also reduced.

In addition, periodically estimating the channel and performing time reversal processing using the passive time reversal technique can achieve Doppler suppression without resampling, thereby greatly reducing the computational complexity of mobile underwater acoustic communication. However, theoretical and experimental results show that this method requires frequent channel estimation to update time reverser coefficients in order to ensure the Doppler suppression performance, especially considering that the AUVs will frequently suffer time-varying Doppler effect in various types of operations as a result of variable-speed movements such as acceleration and deceleration, more frequent channel estimation will be required to ensure the performance, which will lead to a significant reduction in communication efficiency, severely limiting the application of this solution in the underwater acoustic communicators of micro-submersibles such as AUVs.

SUMMARY

In view of one of the above-mentioned problems that algorithms for underwater acoustic communication to suppress Doppler, such as Doppler estimation and resampling compensation, have high computational complexity, high cost, and high hardware resource requirements, the present application provides a method for underwater acoustic communication, including steps of:

capturing a synchronization signal using a cross-correlation operation;

performing time reversal forward shift processing and time backward shifting and reversing processing, respectively, on the synchronization signal to obtain a forward shifted time reversal coefficient and a backward shifted time reversal coefficient;

performing a convolution operation of the forward shifted time reversal coefficient and the backward shifted time reversal coefficient, respectively, with a subsequently captured information sequence to obtain a forward shifted time reversal output and a backward shifted time reversal output;

processing the forward shifted time reversal output and the backward shifted time reversal output, respectively, with a forward shift equalizer and a backward shift equalizer to obtain two sets of equalizer outputs; and selecting one of the two sets of equalizer outputs with a smaller error for data decoding to obtain a desired signal.

Further, the following steps are included after capturing a synchronization signal: capturing a calibration signal that arrives after the synchronization signal using the cross-correlation;

obtaining an actual delay between the synchronization signal and the calibration signal, and obtaining an initial Doppler estimated value by comparing the actual delay with an original delay; and performing carrier compensation on a received signal in a de-carrier processing according to the initial Doppler estimated value.

Furthermore, the method further includes a step of adaptively iterating the forward shifted time reversal coefficient and the backward shifted time reversal coefficient, which includes calculating gradient values corresponding to forward and backward shifts according to errors outputted by the two sets of equalizer outputs; and adaptively updating the forward shifted time reversal coefficient and the backward shifted time reversal coefficient using a gradient descent iterative principle.

By cascading the time reversers and the equalizers and forming a parallel structure, fixed time reversal coefficients in the traditional time reverser are adapted to gradient adaptive time shift iteration based on the equalization error of the parallel structure, so that it has the ability to varying Doppler, greatly reducing the computational complexity of updating the time reversal coefficients in performing channel estimation. Furthermore, after obtaining a forward shifted time reversal output and a backward shifted time reversal output, the following step of equalizer coefficient iteration is included:

capturing a training sequence that arrives before the information sequence, performing a convolution calculation of the forward shifted time reversal coefficient and the backward shifted time reversal coefficient with the training sequence, and sending a result of the convolution calculation for the forward shifted time reversal coefficient and a result of the convolution calculation for the backward shifted time reversal coefficient, respectively, to the forward shift equalizer and the backward shift equalizer, wherein the forward shift equalizer and the backward shift equalizer respectively run an adaptive algorithm, with the training sequence as a target sequence, to perform equalizer coefficient iteration; and running the adaptive algorithm, in an information sequence phase, with decided symbols as the training sequence, to perform the equalizer coefficient iteration.

The forward shifted time reversal coefficient and the backward shifted time reversal coefficient are used for adaptive time shift iteration to achieve low-complexity suppression of Doppler.

Furthermore, the step of equalizer coefficient iteration specifically includes the following steps:

$$e_{fi}[i]=s[i]-\{w_{fi}[i,1],w_{fi}[i,2],\ldots,w_{fi}[i,L]\}\{r_{fi}[i],r_{fi}[i+1],\ldots,r_{fi}[i+L-1]\}^T,$$

$$w_{fi}[i+1,j]=w_{fi}[i,j]+2\mu e_{fi}[i]r_{fi}[i+j-1],$$

$$e_{bi}[i]=s[i]-\{w_{bi}[i,1],w_{fi}[i,2],\ldots,w_{bi}[i,L]\}\{r_{bi}[i],r_{bi}[i+1],\ldots,r_{bi}[i+L-1]\}^T,$$

$$w_{bi}[i+1,j]=w_{bi}[i,j]+2\mu e_{bi}[i]r_{bi}[i+j-1],$$

wherein $w_{fi}[i,j]$ and $w_{bi}[i,j]$ are coefficients of the forward shift equalizer and the backward shift equalizer of order L at time i, respectively, $s[i]$ is the training sequence, $r_{fi}[i]$ and $r_{bi}[i]$ are the forward shifted time reversal output and the backward shifted time reversal output, $e_{fi}[i]$ and $e_{bi}[i]$ are error signals of the forward shift equalizer and the backward shift equalizer, respectively, $\mu$ is a step factor of LMS iteration, and $j=0,\ldots,N-1$, where N is a channel delay spread.

Furthermore, selecting one of the two sets of equalizer outputs specifically includes: inputting the forward shifted time reversal output and the backward shifted time reversal output to the forward shift equalizer and the backward shift equalizer for adaptive iteration through an LMS algorithm to obtain the error signals of the forward shift equalizer and the backward shift equalizer, respectively; deriving mean square values of the error signals of the forward shift equalizer and the backward shift equalizer, respectively, to obtain mean square errors of the forward shift equalizer and the backward shift equalizer; and selecting, for decoding, one of the two sets of equalizer outputs outputted from the forward shift equalizer and the backward shift equalizer with a smaller mean square error.

Since the information frame has completed adaptive multipath focusing after the adaptive time reversal processing, interference caused by time-varying multipath effects can be greatly suppressed.

The present application further proposes a device for underwater acoustic communication which includes an analog-to-digital converter, a set of time reversal-equalizers, an adaptive gradient iterator, and a data decoder. The set of time reversal-equalizers comprises a forward shift time reverser, a forward shift equalizer, a backward shift time reverser, and a backward shift equalizer, input terminals of the forward shift time reverser and the backward shift time reverser are respectively connected to an output terminal of the analog-to-digital converter, output terminals of the forward shift time reverser and the backward shift time reverser are respectively connected to input terminals of the forward shift equalizer and the backward shift equalizer, and output terminals of the forward shift equalizer and the backward shift equalizer are respectively connected to the input terminals of the adaptive gradient iterator. An output terminal of the adaptive gradient iterator is connected to input terminals of the forward shift time reverser and the backward shift time reverser. The data decoder is configured to perform data decoding on outputs of the forward shift equalizer and the backward shift equalizer.

Further, a synchronizer connected to the output terminal of the analog-to-digital converter is further included. The synchronizer is configured to capture a synchronization signal for frame synchronization to establish synchronization. After the frame synchronization is established, Doppler initial estimation and carrier compensation can be performed.

Furthermore, a data preprocessor connected to the input terminal of the analog-to-digital converter is further included. The pre-data processor specifically includes a receiving transducer, a preamplifier and a filter connected to each other. The data preprocessor is used to perform processing such as conversion, amplification, and filtering on the received signal.

The present application further proposes a system for underwater acoustic communication, including any of the above-mentioned device for underwater acoustic communications and a transmitting device. The transmitting device includes a power amplifier, and a transmitting transducer. A transmission interface of the data decoder is connected to the power amplifier, and the power amplifier is connected to the transmitting transducer.

The present application provides a method for underwater acoustic communication which includes steps of capturing a synchronization signal using a cross-correlation operation; performing time forward shifting and reversing processing and time backward shifting and reversing processing, respectively, on the synchronization signal to obtain a forward shifted time reversal coefficient and a backward shifted time reversal coefficient; performing a convolution operation of the forward shifted time reversal coefficient and the backward shifted time reversal coefficient, respectively, with a subsequently captured information sequence to obtain a forward shifted time reversal output and a backward shifted time reversal output; processing the forward shifted time reversal output and the backward shifted time reversal output, respectively, with a forward shift equalizer and a backward shift equalizer to obtain two sets of equalizer outputs; and selecting one of the two sets of equalizer outputs with a smaller error for data decoding to obtain a desired signal. Compared with the usual approach where the fixing of the time reverser coefficients must be updated through channel estimation, the present application performs time-shifted, adaptive iteration on the forward shifted time reversal coefficient and backward shifted time reversal coefficient to adapt to different Doppler. Without resampling, it can further avoid the need for frequent channel estimation under varying Doppler conditions caused by variable-speed sailing of a micro-AUV, and can greatly improve the communication efficiency of a time reversal underwater acoustic communicator under varying Doppler conditions. In addition, in traditional receivers, time reversal and equalization are two independent processing processes, while the present application proposes combining the time reversal and equalization processing to obtain gradient information for time shift adjustment of the time reversal coefficients, namely, an error gradient formed by the set of forward shifted and backward shifted time reversal-equalizers is used to perform time-shifted, adaptive iteration of the time reversal coefficients, thereby realizing adaptation to varying Doppler with lower computational complexity. Ultimately, it reduces the computational complexity and saves costs.

BRIEF DESCRIPTION OF THE DRAWINGS

In order to clearly clarify the technical solutions in embodiments of the present application, the drawings used in the description of the embodiments will be briefly introduced below. It will be apparent that the drawings in the following description are only some embodiments of the present application. Other drawings can be derived by those of ordinary skill in the art from these drawings without paying inventive efforts.

DETAILED DESCRIPTION

In order to clearly clarify the purposes, technical solutions, and advantages of the present application, the present application will be further described in detail below with reference to the accompanying drawings. It will be apparent that the described embodiments are only a part of the embodiments of the present application, but not all of the embodiments. All other embodiments derived by those of ordinary skill in the art, from the embodiments in the present application, without paying inventive efforts, shall fall within the protection scope of the present application.

Figure 1:
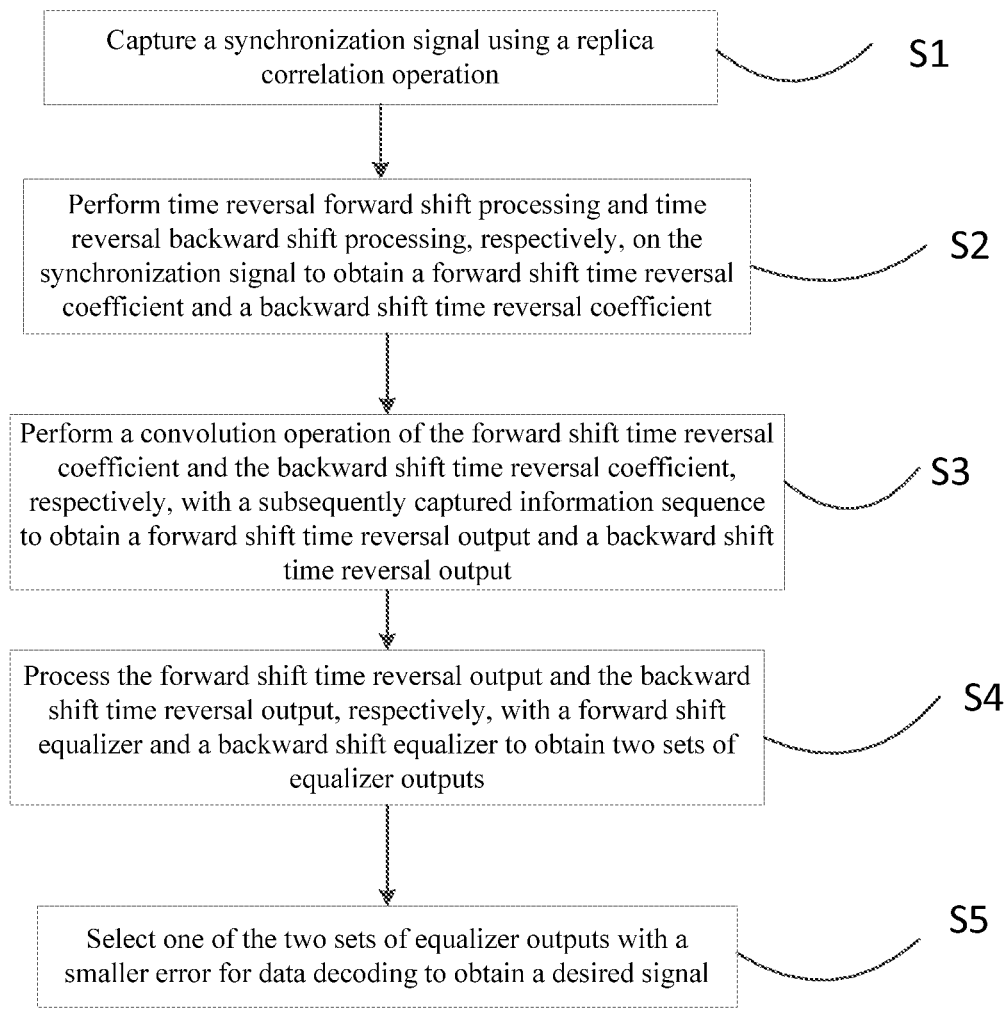
FIG. 1 is a schematic flowchart of a method for underwater acoustic communication according to an embodiment of the present application.
Figure 2:
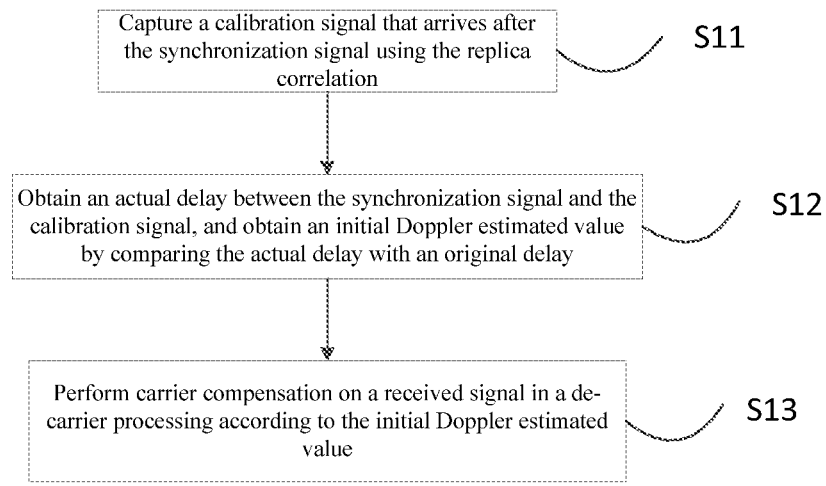
FIG. 2 is a schematic flowchart of a method for underwater acoustic communication according to an embodiment of the present application.

FIG. 1 is a flowchart of a method for underwater acoustic communication according to an embodiment of the present application, including the following steps. Capturing a synchronization signal using a cross-correlation operation. In a preferred embodiment, it specifically includes capturing an input signal for frame synchronization using a cross-correlation operation, determining whether the frame synchronization has arrived by determining whether the cross-correlation result exceeds a set threshold, and determining start of the frame synchronization in time. As shown in FIG. 2, the following steps are further included after capturing a synchronization signal:

capturing a calibration signal that arrives after the synchronization signal using cross-correlation;

obtaining an actual delay between the synchronization signal and the calibration signal, and obtaining an initial Doppler estimated value by comparing the actual delay with an original delay; and performing carrier compensation on a received signal in a de-carrier processing according to the initial Doppler estimated value. After the frame synchronization, the initial Doppler estimation, and the carrier compensation, adaptive time shift iteration is performed.

After establishment of the frame synchronization, the initial Doppler estimation, and the carrier compensation, the synchronization signal is first used as a probe signal $p_r[i]$, where i is a time coordinate. The probe signal $p_r[i]$ is time reversed and superimposed with a current time shift $d[i]$ to adapt to the varying Doppler. Then the time reversal pre-processor coefficient is $p_r\{-i+d[i]\}$.

Assume that an impulse response of the underwater acoustic channel at time i is $h[i,j]$, $j=0, \ldots, N-1$, where N is the channel delay spread. Assuming that the channel satisfies randomness, an information sequence is received as:

$$s_r[i]=s[i]\otimes h[i,j]+n_s[i];$$

where $n_s[i]$ is an interference noise superimposed on the information signal.

Performing time forward shifting and reversing processing, and time backward shifting and reversing processing, respectively, on the synchronization signal to obtain a forward shifted time reversal coefficient and a backward shifted time reversal coefficient.

The received information sequence $s_r[i]$ is subjected to time forward shifting and reversing processing and time backward shifting and reversing processing to obtain a forward shifted time reversal coefficient and a backward shifted time reversal coefficient $p_{fr}[i]=p_r\{-i+d[i]+\Delta\}$, $p_{br}[i]=p_r\{-i+d[i]-\Delta\}$, where $d[i]$ is a current adjustment time shift, and Δ is an adjustment step size for the time shift iteration. Δ is set to 1 in this embodiment.

Performing a convolution operation of the forward shifted time reversal coefficient and the backward shifted time reversal coefficient, respectively, with a subsequently captured information sequence to obtain a forward shifted time reversal output and a backward shifted time reversal output.

In a specific embodiment, under a time-varying channel condition, the following can be obtained from the respective convolution operation of the forward shifted time reversal coefficient and the backward shifted time reversal coefficient with the subsequently captured information sequence:

$$r'_{fi}[i] = s_r[i] \otimes p_{fr}[-i] = s[i] \otimes h[i, j+D] \otimes h[i, -j] \otimes p_{fr}[-i] + n_f[i] =$$
$$s[i] \otimes h[i, j+D] \otimes h[i, -j] \otimes p_r[-i] \otimes \delta\{d[i] + \Delta\} + n_f[i] =$$
$$s[i] \otimes h[i, j] \otimes h[i, -j] \otimes p_r[-i] \otimes \delta\{\delta[i] + \Delta + D\} + n_f[i];$$

$$r'_{bi}[i] = s_r[i] \otimes p_{br}[-i] = s[i] \otimes h[i, j+D] \otimes h[i, -j] \otimes p_{br}[-i] + n_b[i] =$$
$$s[i] \otimes h[i, j+D] \otimes h[i, -j] \otimes p_r[-i] \otimes \delta\{d[i] - \Delta\} + n_b[i] =$$
$$s[i] \otimes h[i, j] \otimes h[i, -j] \otimes p_r[-i] \otimes \delta\{d[i] - \Delta + D\} + n_b[i];$$

where $n_f[i], n_b[i]$ are noise interference terms of the forward shift time reverser and the backward shift time reverser, respectively, and $h[i,j] \otimes h_i[i,-j]$ is the channel response of the channels after time-reversal focusing, approximately an impulse $\delta[i]$. In order to eliminate $p_r[-i]$ in the result, $r_{fi}'[i]$, $r_{bi}'[i]$ are subject to a convolution operation with the probe signal $p_r[i]$, thereby obtaining the forward shifted time reversal output and the backward shifted time reversal output. That is:

$$r_{fi}[i] = r_{fi}'[i] \otimes p_r[i] \approx s[i] \otimes \delta[i] \otimes [i] \otimes \delta\{d[i] + \Delta + D\} + n_{ff}[i]$$

$$r_{bi}[i] = r_{bi}'[i] \otimes p_r[i] \approx s[i] \otimes \delta[i] \otimes [i] \otimes \delta\{d[i] - \Delta + D\} + n_{bb}[i]$$

where $n_{ff}[i]$, $n_{bb}[i]$ are noise interference terms of the forward shift time reverser and the backward shift time reverser:

$$n_{ff}[i] = n_f[i] \otimes p_i[t]$$

$$n_{bb}[i] = n_b[i] \otimes p_i[t]$$

Processing the forward shifted time reversal output and the backward shifted time reversal output, respectively, with a forward shift equalizer and a backward shift equalizer to obtain two sets of equalizer outputs.

Figure 3:
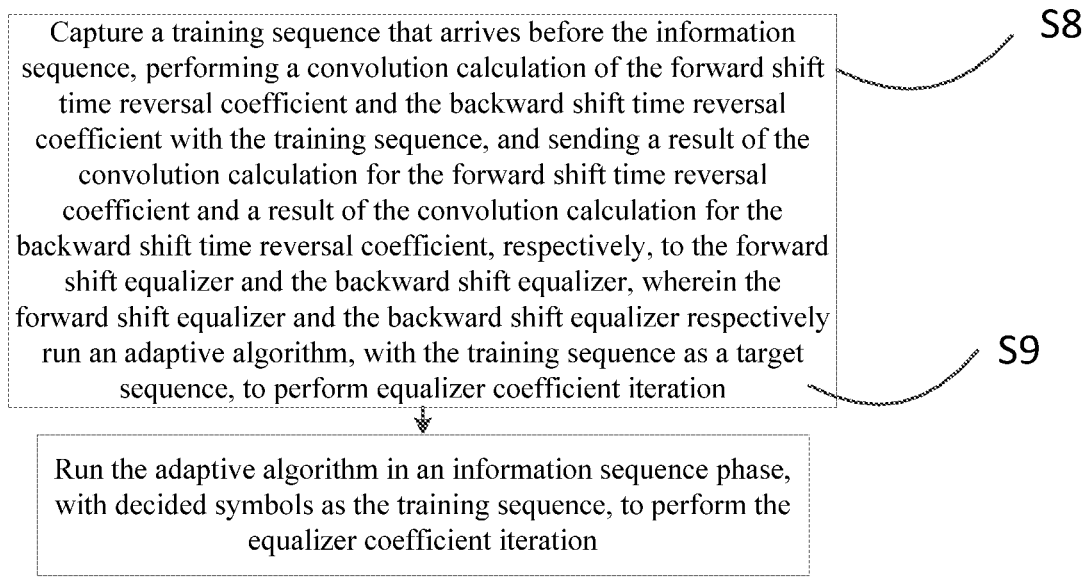
FIG. 3 is a schematic flowchart of a step of equalizer coefficient iteration in a method for underwater acoustic communication according to an embodiment of the present application.

As shown in FIG. 3, after obtaining a forward shifted time reversal output and a backward shifted time reversal output, the following steps of equalizer coefficient iteration are included. In a specific embodiment, the equalizer adopts an LMS (Least mean square) algorithm for adaptive iteration.

In an initial phase, capturing a training sequence that arrives before the information sequence, performing a convolution calculation of the forward shifted time reversal coefficient and the backward shifted time reversal coefficient with the training sequence, and sending a result of the convolution calculation for the forward shifted time reversal coefficient and a result of the convolution calculation for the backward shifted time reversal coefficient, respectively, to the forward shift equalizer and the backward shift equalizer, wherein the forward shift equalizer and the backward shift equalizer respectively run an adaptive algorithm, with the training sequence as a target sequence, to perform equalizer coefficient iteration.

After the algorithm converges, running the adaptive algorithm in an information sequence phase, with decided symbols as the training sequence, to perform the equalizer coefficient iteration. Adaptive time shift iteration is performed using the forward shifted time reversal coefficient and the backward shifted time reversal coefficient to achieve low-complexity suppression of Doppler. The decided symbols refer to symbols obtained by deciding data that has been subject to iteration processing previously using a preset training sequence. This way, only a preset training sequence is required in the initial phase.

In a specific embodiment, the step of equalizer coefficient iteration specifically includes the following steps:

$$e_{fi}[i] = s[i] - \{w_{fi}[i,1], w_{fi}[i,2], \ldots, w_{fi}[i,L]\}\{r_{fi}[i], r_{fi}[i+1], \ldots, r_{fi}[i+L-1]\}^T,$$

$$w_{fi}[i+1,j] = w_{fi}[i,j] + 2\mu e_{fi}[i]r_{fi}[i+j-1],$$

$$e_{bi}[i] = s[i] - \{w_{bi}[i,1], w_{fi}[i,2], \ldots, w_{bi}[i,L]\}\{r_{bi}[i], r_{bi}[i+1], \ldots, r_{bi}[i+L-1]\}^T,$$

$$w_{bi}[i+1,j] = w_{bi}[i,j] + 2\mu e_{bi}[i]r_{bi}[i+j-1],$$

where $w_{fi}[i,j]$ and $w_{bi}[i,j]$ are coefficients of the forward shift equalizer and the backward shift equalizer of order L at time i, respectively, s[i] is the training sequence, $e_{fi}[i]$ and $e_{bi}[i]$ are error signals of the forward shift equalizer and the backward shift equalizer, respectively, and μ is a step factor of LMS iteration.

Selecting one of the two sets of equalizer outputs with a smaller error for data decoding to obtain a desired signal.

Figure 4:
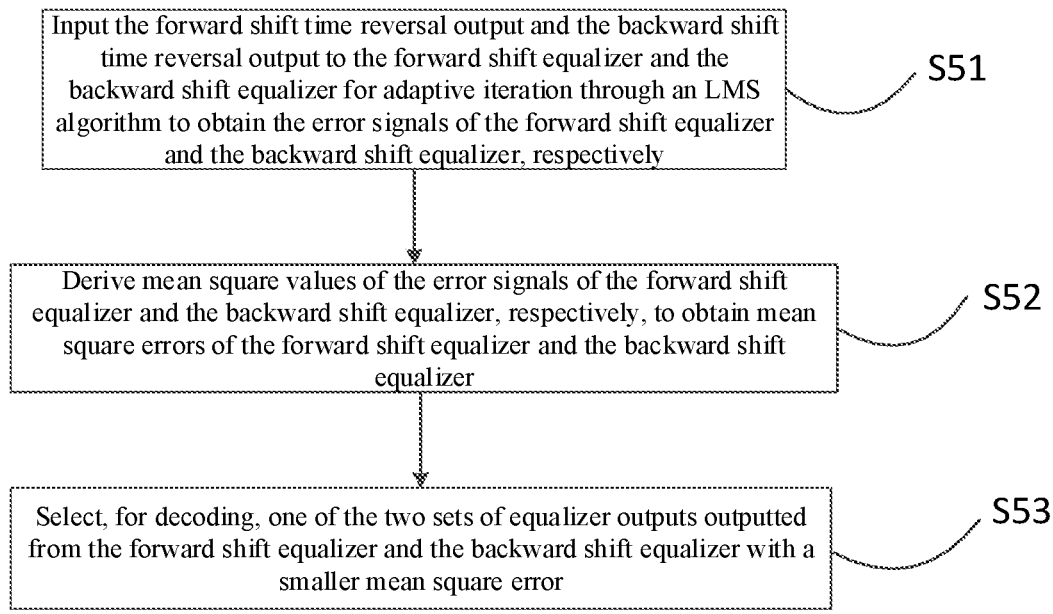
FIG. 4 is a schematic flowchart of a method for underwater acoustic communication according to an embodiment of the present application.

In a specific embodiment, as shown in FIG. 4, selecting one of the two sets of equalizer outputs specifically includes: Inputting the forward shifted time reversal output and the backward shifted time reversal output to the forward shift equalizer and the backward shift equalizer for adaptive iteration through an LMS algorithm to obtain the error signals, $e_{fi}[i]$ and $e_{bi}[i]$, of the forward shift equalizer and the backward shift equalizer, respectively.

Since it cannot be guaranteed in theory that the error cost function of the time shift parameters has a single concave characteristic, in order to avoid falling into the local optimal solution in the gradient iteration, mean square values of the error signals, $e_{fi}[i]$ and $e_{bi}[i]$, of the forward shift equalizer and the backward shift equalizer are derived, respectively, by setting a time window with a width of lw, thus obtaining mean square errors of the forward shift equalizer and the backward shift equalizer. That is:

$$Er_{fi}[i] = \sum_{1}^{lw} e_{fi}[i+J-1];$$

$$Er_{bi}[i] = \sum_{1}^{lw} e_{bi}[i+J-1];$$

Selecting, for decoding, one of the two sets of equalizer outputs, your, outputted from the forward shift equalizer and the backward shift equalizer with a smaller mean square error. That is:

$$y_{out}[i] = \begin{cases} \{w_{fi}[i,1], L, w_{fi}[i,L]\}\{r_{fi}[i], r_{fi}[i+1], L, r_{fi}[i+L-1]\}^T & Er_{fi}[i] \le Er_{bi}[i] \\ \{w_{bi}[i,1], L, w_{bi}[i,L]\}\{r_{bi}[i], r_{bi}[i+1], L, r_{bi}[i+L-1]\}^T & Er_{bi}[i] \le Er_{fi}[i] \end{cases}$$

Since the information frame has completed adaptive multipath focusing after the adaptive time inversion processing, interference caused by time-varying multipath effects can be greatly suppressed. Therefore, the time-reversed and equalized information sequence is finally sent to the data decoder for demodulation processing to recover the information symbols. In a preferred embodiment, a QPSK demodulation algorithm is used to perform QPSK signal demodulation processing in a DSP chip.

Figure 5:
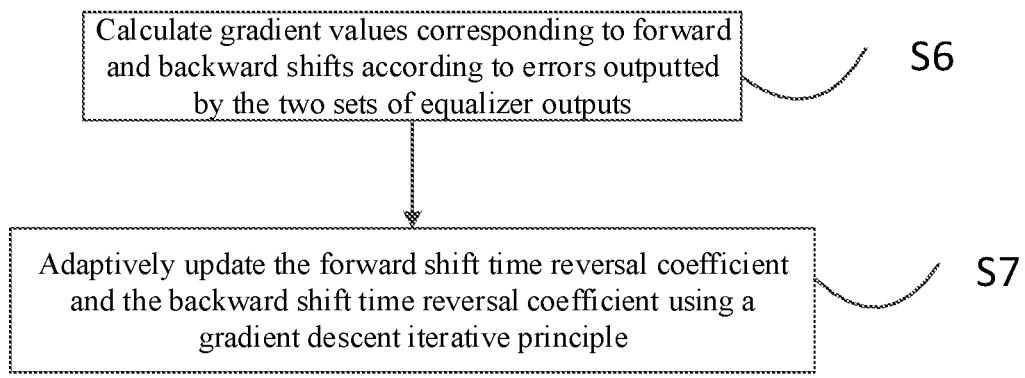
FIG. 5 is a schematic flowchart of adaptive iteration of forward shifted time reversal coefficients and backward shifted time reversal coefficients in a method for underwater acoustic communication according to an embodiment of the present application.

In addition, as shown in FIG. 5, it also includes the steps of adaptively iterating the forward shifted time reversal coefficient and the backward shifted time reversal coefficient:

Calculating gradient values corresponding to forward and backward shifts according to errors outputted by the two sets of equalizer outputs.

In a specific embodiment, the mean square error of the outputs of the forward shift equalizer and the backward shift equalizer is used to construct the gradient values obtained by the forward and backward shifts:

$$\text{grad}[i] = Er_{fi}[i] - Er_{bi}[i];$$

Adaptively updating the forward shifted time reversal coefficient and the backward shifted time reversal coefficient using a gradient descent iterative principle.

In a specific embodiment, by setting a threshold G, the gradient values and the symbol information can be used to perform forward and backward control under gradient iteration:

$$d[i+1] = \begin{cases} d[i] & |\text{grad}[i]| \le G \\ d[i] - \Delta & \text{grad}[i] > G \\ d[i] + \Delta & \text{grad}[i] < -G \end{cases}$$

As a result, the current time shift can be adaptively updated, so that the time-reverse focus processing performance under time-varying conditions can be guaranteed with low computational complexity, enabling this technical solution to adapt to varying Doppler.

Figure 6:
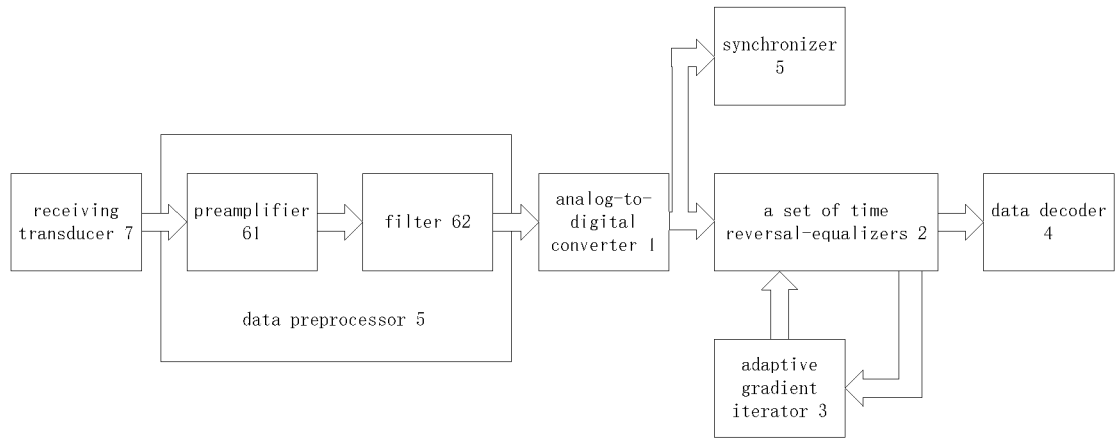
FIG. 6 is a schematic diagram of a device for underwater acoustic communication according to an embodiment of the present application.
Figure 7:
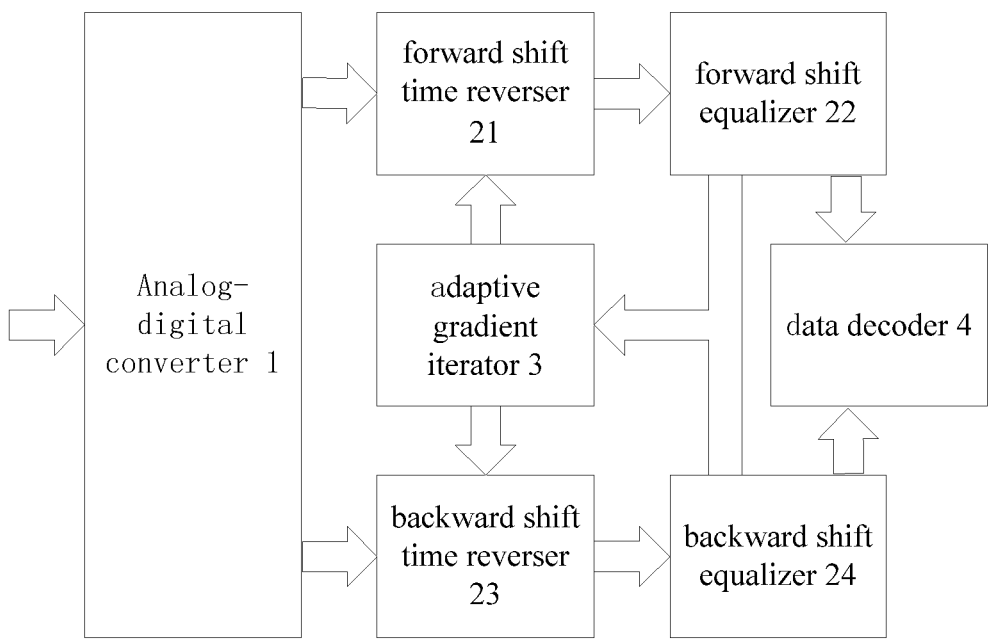
FIG. 7 is a schematic structural diagram of a set of time reversal-equalizers of a device for underwater acoustic communication according to an embodiment of the present application.

The present application further proposes a device for underwater acoustic communication. The device for underwater acoustic communication is disposed in a receiving device of an underwater acoustic communicator. As shown in FIG. 6, the device for underwater acoustic communication includes an analog-to-digital converter 1, a set of time reversal-equalizers 2, an adaptive gradient iterator 3 and a data decoder 4. As shown in FIG. 7, the set of time reversal-equalizers 2 includes a forward shift time reverser 21, a forward shift equalizer 22, a backward shift time reverser 23, and a backward shift equalizer 24. The input terminals of the forward shift time reverser 21 and the backward shift time reverser 23 are respectively connected to the output terminal of the analog-to-digital converter 1. The output terminals of the forward shift time reverser 21 and the backward shift time reverser 23 are respectively connected to the input terminals of the forward shift equalizer 22 and the backward shift equalizer 24. The output terminals of the forward shift equalizer 22 and the backward shift equalizer 24 are respectively connected to the input terminal of the adaptive gradient iterator 3. The output terminal of the adaptive gradient iterator 3 is connected to the input terminals of the forward shift time reverser 21 and the backward shift time reverser 23. The data decoder 4 is used to perform data decoding on the outputs of the forward shift equalizer 22 and the backward shift equalizer 24. By cascading the time reversers and the equalizers and forming a parallel structure, the time reversal coefficients fixed in the traditional time reverser are modified to construct gradient adaptive time shift iteration based on the equalization error of the parallel structure, so that it has the ability to adapt to varying Doppler, greatly reducing the computational complexity for updating the time reversal coefficients when performing channel estimation.

Figure 8:
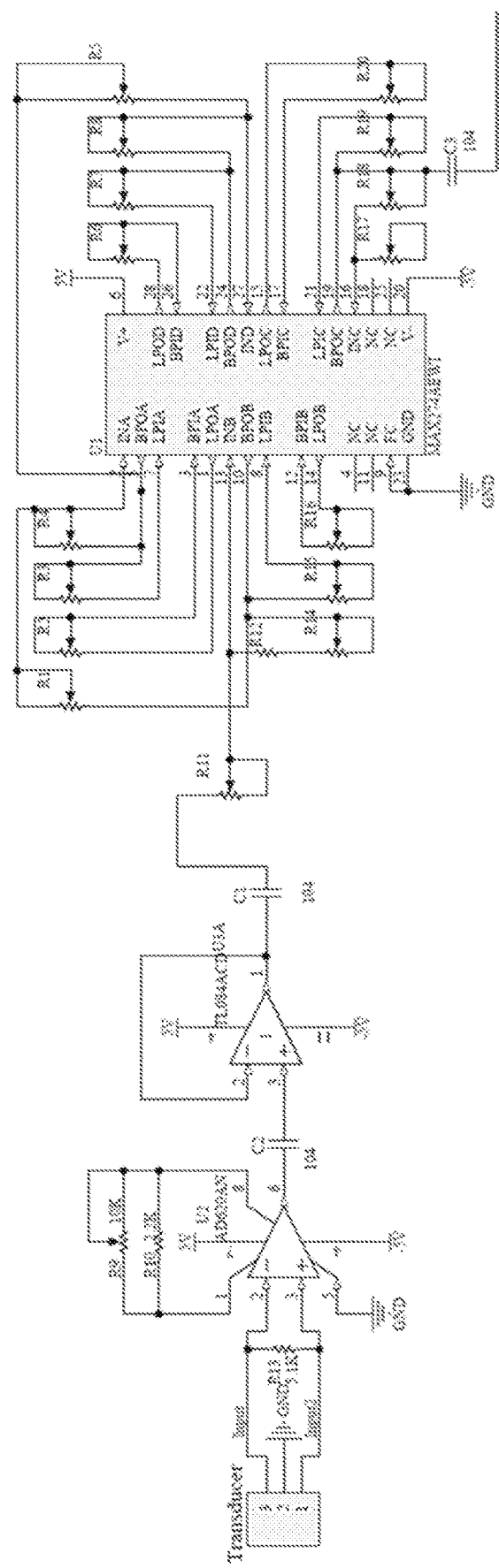
FIG. 8 is an interface circuit diagram of an analog-to-digital converter and a DSP chip of a device for underwater acoustic communication according to an embodiment of the present application.

In a specific embodiment, the analog-to-digital converter 1 includes a DDS chip and an ADC chip, and the ADC chip is controlled by an output signal of the DDS chip to perform analog-to-digital conversion on the input signal. The DDS chip has the advantages of low cost, low power consumption, high resolution, and fast conversion time, and allows for higher efficiency and lower cost when used with the ADC chip. In a preferred embodiment, the analog-to-digital converter 1 includes an AD9851DDS chip and a MAX153ADC chip, and the signal processing uses a DSP chip, for example, a TMS320C6713 processor. In other optional embodiments, the DSP chip may alternatively include a chip of TMS320C54X series. The function of the analog-to-digital converter 1 is to realize time-divided, multi-channel input through the switching of the channels. Under the configuration of the DSP chip, the DDS chip outputs a square wave signal with a frequency of 96 kHz for controlling the ADC chip to perform analog-to-digital conversion on the input signal. The connection circuit diagram between the AD9851DDS chip, the MAX153ADC chip and the TMS320C6713 processor is shown in FIG. 8. During an initialization phase, the TMS320C6713 processor configures the pins of the AD9851DDS chip through I/O ports GP0, GP1, GP2, and GP3, and configures the type and frequency of the output waveform at the output pin of the AD9851 chip. In this embodiment, the output type is a square wave, and the oscillation frequency of the square wave is set to fs=75 kHz, namely, the sampling rate is 75 ksps. In other optional embodiments, the analog-to-digital converter 1 may alternatively be composed of other forms of hardware circuits, including, and is not limited to, other types of DDS chips, ADC chips, and DSP chips.

In a specific embodiment, the receiving device of the underwater acoustic communicator further includes a synchronizer 5 connected to the output terminal of the analog-to-digital converter 1, and the synchronizer 5 is configured to perform frame synchronization and capture a synchronization signal to establish synchronization. After the frame synchronization is established, Doppler initial estimation and carrier compensation can be performed. In other optional embodiments, the synchronizer 5 may alternatively be other hardware circuits or a combination of software and hardware.

Figure 9:
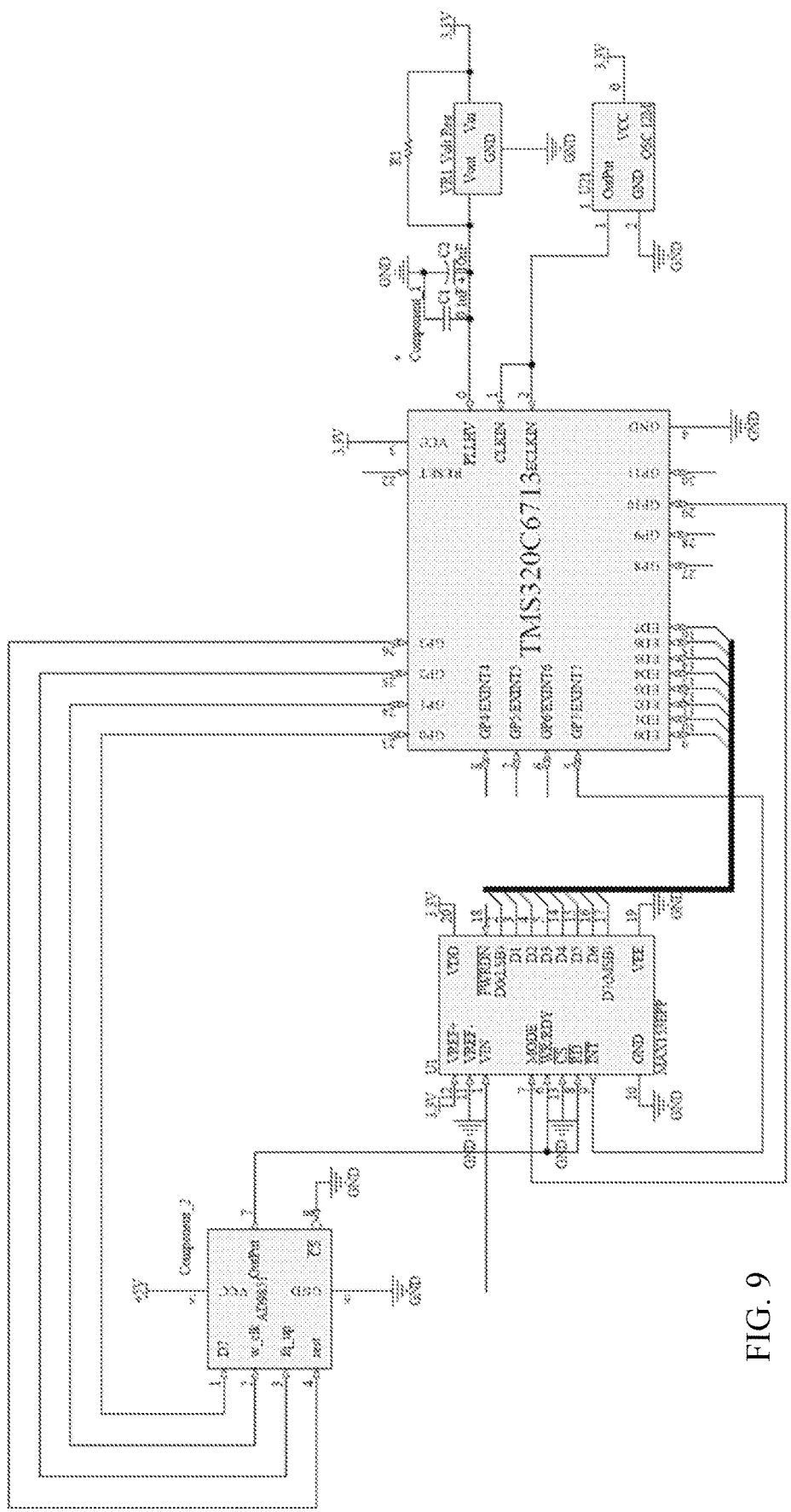
FIG. 9 is a circuit diagram of a data preprocessor of a device for underwater acoustic communication according to an embodiment of the present application.

The synchronizer 5, the set of time reversal-equalizers 2, the adaptive gradient iterator 3, and the data decoder 4 are implemented by a dedicated chip or a common circuit. The dedicated chip or common circuit is simple in structure, convenient to connect, and easy to integrate. In a preferred embodiment, the synchronizer 5, the set of time reversal-equalizers 2, the adaptive gradient iterator 3, and the data decoder 4 are implemented by a DSP chip, for example, a TMS320C6713 processor. In other optional embodiments, the synchronizer 5, the set of time reversal-equalizers 2, the adaptive gradient iterator 3, and the data decoder 4 may be one or more of TMS320F28069, TMS320F2812, TMS320F28335, and TMS320VC6220. Alternatively, they are formed by a combination of a general-purpose digital correlator chip TMC2023, a multiplier MC1496, and an adder 74L5283. The synchronizer 5 may include two parts: a Barker code identifier and a synchronization protection. The Barker code identifier includes a shift register, an adder, and a decider. The forward shift equalizer 22 and the backward shift equalizer 24 may be implemented with a combination of a filter and an attenuator. The forward shift time reverser 21, the backward shift time reverser 23, and the adaptive gradient iterator 3 are digital correlators. Digital correlators are similar to matching filters and can be regarded as multiply-accumulate operators, that is, the input data stream, together with the local code, is multiplied and accumulated step by step under the driving of the sampling synchronization clock (within one clock tick). The adaptive gradient iterator 3 may alternatively include a hardware adder and a hardware multiplier. The data decoder 4 employs the classic QPSK demodulation processing. For example, the general QPSK demodulation integrated chip MSM7582B can be used. After the frame synchronization is established, the probe signal and information frame signal are input to the subsequent ADC chip and DSP chip for processing. The interface circuit for the signals entering the ADC chip and the DSP chip is shown in FIG. 9. The connection between the AD9851DDS chip, the MAX153ADC chip, and the TMS320C6713 processor in the receiving device of an embodiment underwater acoustic communicator is as follows: After the input signal is sent to the input Vin pin of the MAX153ADC chip, a square wave signal with a frequency of 96 kHz outputted from the AD9851DDS chip is connected to the WR/RDY and RD terminals of the MAX153ADC chip to start the AD conversion. After the AD conversion, the INT signal of the MAX153ADC chip has a low level and is connected to the GP7/EXINT7 pin of the TMS320C6713 processor to trigger an external interrupt service routine of the DSP chip. The data lines ED0-ED7 of the DSP chip are connected to the data lines D0-D7 of the MAX153ADC chip U1 to input the ADC conversion result. After the external interrupt service routine obtains the conversion data of the ADC chip, the data inputted to the DSP chip is double-buffered for subsequent processing to ensure real-time performance.

In a specific embodiment, the receiving device of the underwater acoustic communicator further includes a data preprocessor 6 connected to the input terminal of the analog-to-digital converter 1 and a receiving transducer 7 connected to the data preprocessor 6. The data preprocessor 6 includes a preamplifier 61 and a filter 62 connected to each other. The receiving transducer 7 is used to convert the received acoustic signal into an electric signal, and the data preprocessor 6 is used to amplify and filter the signal.

The data preprocessor 6 is configured to perform processing such as conversion, amplification, and filtering on the received signal. In a preferred embodiment, the receiving transducer 7 is a broadband receiving hydrophone produced by a state-owned 612 factory. The data preprocessor 6 is composed of an AD620 low-noise preamplifier chip from the American AD company, a TL084 operation amplifier chip, and a MAX274 switched capacitor filter chip from Maxium. The MAX273 switched capacitor filter is configured as a band-pass filter with a pass band of 13-18 kHz. The specific circuit is shown in FIG. 8. In other optional embodiments, the data preprocessor 6 may be implemented with other hardware circuits to pre-process the data, and the receiving transducer 7 may also be implemented with other receivers. The preamplifier 61 and the filter 62 are connected to the receiving signal terminals of the receiving array elements of the receiving device for preprocessing the multi-channel received signal. The synchronizer 5 uses a cross-correlation operation to capture the frame synchronization signal, and is used to establish the starting point of time for time reversal processing and decoding of the received signals. Meanwhile, the copy correction is used to process the calibration signal to obtain the actual delay between the synchronization signal and the calibration signal. The initial Doppler estimation of the channel is performed by comparing with the original delay. The obtained Doppler initial estimation value is used, as a compensation carrier in the de-carrier processing of the received signal, to generate a baseband signal.

The set of time reversal-equalizers 2 is composed of time reversal-equalizers (a forward shifted time reversal-equalizer and a backward shifted time reversal-equalizer) formed by cascading the forward shift time reverser 21, the forward shift equalizer 22, the backward shift time reverser 23, and the backward shift equalizer 24. After time-reversing the input synchronization signal, it first performs time shift processing according to the time shift iteration of the time reversal coefficients by the adaptive iterator 3, and then performs a delay unit of forward shifting and a delay unit of backward shifting to form corresponding time reversal coefficients. After the adaptive iteration, the forward shifted time reversal coefficient and backward shifted time reversal coefficient are convoluted with the subsequent training sequence and information sequence to complete the passive time reversal. Thus, two corresponding outputs, i.e., a forward shifted time reversal output and a backward shifted time reversal output, are outputted, and sent to the corresponding cascaded forward shift equalizer 22 and backward shift equalizer 24 respectively.

The forward shift equalizer 22 and the backward shift equalizer 24 use the training sequence as the target sequence in the information sequence phase to input the adaptive gradient iterator 3 to iterate the equalization coefficients, and use the decided symbols as the training sequence in the training sequence phase to input the adaptive gradient iterator 3 to perform iteration of the equalization coefficients. The errors of the forward shift equalizer 22 and the backward shift equalizer 24 are outputted to the adaptive gradient iterator 3. Based on the output errors of the forward shift equalizer 22 and the backward shift equalizer 24, the equalizer output with small errors are selected and outputted to the data decoder 4 for data decoding. The adaptive gradient iterator 3 calculates the error gradient according to the errors outputted by the set of two equalizers, so as to perform adaptive iterative adjustment for gradient iteration of the delay, outputs the time shift corresponding to the current time reversal coefficients, and sends them to the set of time reversers to achieve adaptive time shift iteration of the multi-channel time reversal coefficients.

Figure 10:
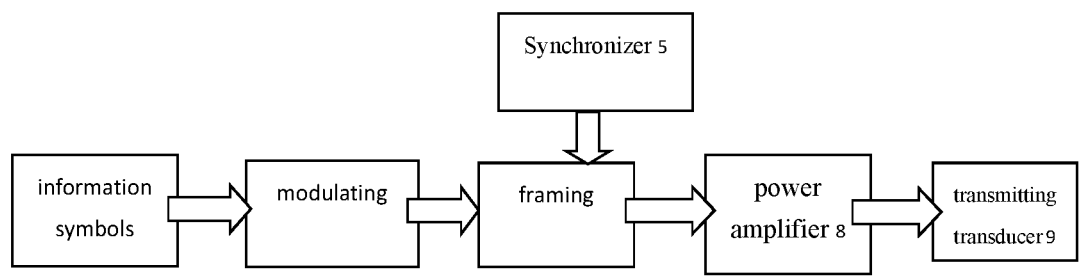
FIG. 10 is a schematic diagram of a transmitting device of a system for underwater acoustic communication according to an embodiment of the present application.

The data decoder 4 uses a demodulation method commonly used in the art to decode the time-reversed and equalized output with small errors to recover the original modulated data. In a preferred embodiment, the data decoder may be implemented with a decoding chip such as a KM1102 chip, or other data decoding chips or circuits. The present application further proposes a system for underwater acoustic communication, including any of the above-mentioned devices for underwater acoustic communication and a transmitting device. As shown in FIG. 10, the transmitting device includes a power amplifier 8 and a transmitting transducer 9. The information symbols of the transmit signal are modulated and processed by the synchronizer 5 to capture the synchronization signal to establish synchronization, and, after framing, is connected to the power amplifier 8 which is connected to the transmitting transducer 9. In a preferred embodiment, the transmitting transducer 9 is a cylindrical piezoelectric ceramic hydroacoustic transducer with a center frequency of 13-18 kHz. In other optional embodiments, the power amplifier 8 is implemented with a power amplifier circuit known in the art for signal transmission, and the transmitting transducer 9 may be implemented with other feasible receivers.

Figure 11:
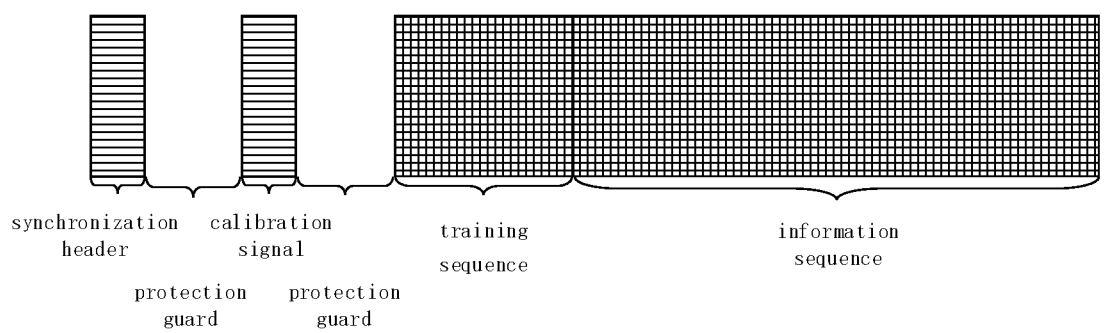
FIG. 11 is a schematic structural diagram of a transmitted signal frame of a system for underwater acoustic communication according to an embodiment of the present application.

In a specific embodiment, the starting position of the transmitting frame format of the transmitting device is a frame synchronization signal, which is used to establish the starting point in time for data demodulation at the receiving end. At the same time, the frame synchronization signal is also used as a time-reversed probe signal for acquiring channel multipath information through channel transmission. A synchronization header is followed by a calibration signal, a training sequence, and an information sequence. The calibration signal is also a linear frequency modulation signal, which is used to perform Doppler initialization by calculating the actual delay directly with the synchronization signal. The training sequence is known data and used to train to obtain the initial coefficients of the channel equalizer. The information sequence is the data to be transmitted, and each training sequence and information sequence symbol is spread-spectrum-modulated. A guard interval is inserted between the frame synchronization header, the calibration signal, and the training sequence. The signal frame format is shown in FIG. 11.

In a specific embodiment, the transmission signal adopts a quadrature phase modulation (QPSK) system, the signal sampling rate is 75 KHz, the carrier frequency is 15 KHz, the bandwidth is 13 KHz~18 KHz, the signal carrier frequency is 16 kHz, and the symbol width is 0.5 ms. The training sequence is a QPSK sequence of 400 known bits, that is, having a length of 50 ms. The frame synchronization signal and the calibration signal are linear frequency modulation signals with a frequency of 13 kHz to 18 kHz and a length of 50 ms. Respective guard intervals having a length of 50 ms are set between the synchronization signal, the calibration signal, and the training signal in the signal frame. In other optional embodiments, the transmission signal may alternatively adopt other modulation systems.

The application provides a method, device and system for underwater acoustic communication which utilize limited processor hardware resources in an underwater acoustic communicator of a miniature underwater unmanned submersible, and provides an underwater acoustic communicator which achieves low complexity suppression of Doppler through adaptive time shift iteration and adaptive time-reversal processing of the time reversal coefficients. Compared with the usual approach where the fixing of the time reverser coefficients must be updated through channel estimation, the present application performs time-shifted, adaptive iteration on the forward shifted time reversal coefficient and backward shifted time reversal coefficient to adapt to different Doppler. Without resampling, it can further avoid the need for frequent channel estimation under varying Doppler conditions caused by variable-speed sailing of a micro-AUV, and can greatly improve the communication efficiency of a time reversal underwater acoustic communicator under varying Doppler conditions. In addition, in traditional receivers, time reversal and equalization are two independent processing processes, while the present application proposes combining the time reversal and equalization processing to obtain gradient information for time shift adjustment of the time reversal coefficients, namely, an error gradient formed by the set of forward shift and backward shift time reversal-equalizers is used to perform time-shifted, adaptive iteration of the time reversal coefficients, thereby realizing adaptation to varying Doppler with lower computational complexity. Ultimately, it reduces the computational complexity and saves costs.

It will be apparent that various modifications and changes to the embodiments of the present application can be made by those skilled in the art without departing from the spirit and scope of the present application. In this way, if these modifications and changes are within the scope of the claims of the present application and equivalents thereof, the present application is also intended to cover these modifications and changes. The word "comprising" does not exclude the presence of other elements or steps than those listed in a claim. The mere fact that certain measures are recited in mutually different dependent claims does not indicate that a combination of these measures cannot be used to advantage. Any reference signs in the claims should not be construed as limiting the scope.

What is claimed is:

1. An underwater acoustic communicator for underwater telemetry and remote control under time-varying multipath channel, comprises a receiving device,
    configured to capture a frame synchronization signal, a calibration signal, a training sequence and an information sequence transmitted in sequence via water medium from a transmitting device of another underwater acoustic communicator, and
    perform a time forward shifting and reversing processing on a captured synchronization signal to obtain a forward shifted time reversal coefficient, and perform a time backward shifting and reversing processing on the captured synchronization signal to obtain a backward shifted time reversal coefficient;
    perform a convolution operation of the forward shifted time reversal coefficient with a subsequently captured information sequence to obtain a forward shifted time reversal output, and perform a convolution operation of the backward shifted time reversal coefficient with the captured information sequence to obtain a backward shifted time reversal output;
    process the forward shifted time reversal output with a first equalizer to obtain a set of equalizer outputs, and process the forward shifted time reversal output with a second equalizer to obtain another set of equalizer outputs;
    select one with smaller error from the above two equalizers; and
    decode over an output of the selected equalizer to enable underwater telemetry and remote control under time-varying multipath channel,
    wherein the receiving device comprises an adaptive gradient iterator configured to iterate equalizer coefficient, by means of:

capturing the training sequence that arrives before the information sequence, performing a convolution calculation of the forward shifted time reversal coefficient and the backward shifted time reversal coefficient with the training sequence, and sending results of the convolution calculation respectively to the first equalizer and the second equalizer, wherein the first equalizer and the second equalizer respectively run an adaptive algorithm, with the training sequence as a target sequence, to perform equalizer coefficient iteration; and running the adaptive algorithm in an information sequence phase, with decided symbols as the training sequence, to perform equalizer coefficient iteration, wherein equalizer coefficient iteration is given by:

$$e_{fi}[i]=s[i]-\{w_{fi}[i,1],w_{fi}[i,2],\ldots,w_{fi}[i,L]\}\{r_{fi}[i],r_{fi}[i+1],\ldots,r_{fi}[i+L-1]\}^T,$$

$$w_{fi}[i+1,j]=w_{fi}[i,j]+2\mu e_{fi}[i]r_{fi}[i+j-1],$$

$$e_{bi}[i]=s[i]-\{w_{bi}[i,1],w_{bi}[i,2],\ldots,w_{bi}[i,L]\}\{r_{bi}[i],r_{bi}[i+1],\ldots,r_{bi}[i+L-1]\}^T,$$

$$w_{bi}[i+1,j]=w_{bi}[i,j]+2\mu e_{bi}[i]r_{bi}[i+j-1],$$

wherein $w_{fi}[i,j]$ and $w_{bi}[i,j]$ are coefficients of the first equalizer and the second equalizer of order L at time i, respectively, s[i] is the training sequence, $r_{fi}[i]$ and $r_{bi}[i]$ are the two sets of equalizer outputs, $e_{fi}[i]$ and $e_{bi}[i]$ are error signals of the first equalizer and the second equalizer, respectively, $\mu$ is a step factor of LMS iteration, and j=0, ..., N−1, where N is a channel delay spread.

2. The underwater acoustic communicator according to claim 1, wherein the receiving device comprising a synchronizer configured to capture a calibration signal that arrives after the synchronization signal using a cross-correlation;

obtain an actual delay between the synchronization signal and the calibration signal, and obtaining an initial Doppler estimated value by comparing the actual delay with an original delay; and perform carrier compensation on a received signal in a de-carrier processing according to the initial Doppler estimated value.

3. The underwater acoustic communicator according to claim 1, wherein the receiving device comprising an adaptive gradient iterator configured to adaptively iterating the forward shifted time reversal coefficient and the backward shifted time reversal coefficient, by means of:

calculating gradient values corresponding to forward and backward shifts according to errors outputted by the two sets of equalizer outputs; and adaptively updating the forward shift time reversal coefficient and the backward shift time reversal coefficient using a gradient descent iterative principle.

4. The underwater acoustic communicator according to claim 1, wherein the receiving device comprises a data decoder configured to input the two sets of equalizer outputs to the first equalizer and the second equalizer for adaptive iteration through an LMS algorithm to obtain the error signals of the first equalizer and the second equalizer, respectively;

derive mean square values of the error signals of the first equalizer and the second equalizer, respectively, to obtain mean square errors of the first equalizer and the second equalizer; and select, for decoding, one of the two sets of equalizer outputs which has a smaller mean square error.

5. The underwater acoustic communicator according to claim 1, wherein comprising:

an analog-to-digital converter;

a set of time reversal-equalizers;

an adaptive gradient iterator; and a data decoder, wherein the set of time reversal-equalizers comprises a forward shift time reverser, a first equalizer, a backward shift time reverser, and a second equalizer, input terminals of the forward shift time reverser and the backward shift time reverser are respectively connected to an output terminal of the analog-to-digital converter, output terminals of the forward shift time reverser and the backward shift time reverser are respectively connected to input terminals of the first equalizer and the second equalizer, and output terminals of the first equalizer and the second equalizer are respectively connected to the input terminals of the adaptive gradient iterator, wherein an output terminal of the adaptive gradient iterator is connected to input terminals of the forward shift time reverser and the backward shift time reverser, and wherein the data decoder is configured to perform data decoding on outputs of the first equalizer and the second equalizer.

6. The underwater acoustic communicator according to claim 5, wherein comprising a synchronizer connected to the output terminal of the analog-to-digital converter, wherein the synchronizer is configured to capture a synchronization signal for frame synchronization to establish synchronization.

7. The underwater acoustic communicator according to claim 5, wherein comprising a data preprocessor connected to an input terminal of the analog-to-digital converter, wherein the data preprocessor comprises a receiving transducer, a preamplifier and a filter connected to each other.

* * * * *